United States Patent
Peng et al.

(12) 
(10) Patent No.: US 7,240,915 B2
(45) Date of Patent: Jul. 10, 2007

(54) VEHICLE SEATING SYSTEM WITH AIRBAG-BASED OCCUPANT REACTION SURFACE

(75) Inventors: James Z Peng, Ypsilanti, MI (US); Joseph E Abramczyk, Farmington Hills, MI (US); Kurt L Ewing, Plymouth, MI (US); John J Pinkerton, Canton, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 430 days.

(21) Appl. No.: 10/904,898

(22) Filed: Dec. 3, 2004

(65) Prior Publication Data

US 2006/0119082 A1 Jun. 8, 2006

(51) Int. Cl.
*B60R 21/20* (2006.01)
*B60R 21/16* (2006.01)

(52) U.S. Cl. .................... 280/730.2; 280/743.2
(58) Field of Classification Search ............ 280/730.2, 280/743.2; *B60R 21/20, 21/16*
See application file for complete search history.

(56) References Cited

U.S. PATENT DOCUMENTS

| | | | |
|---|---|---|---|
| 5,607,180 A | 3/1997 | Kornhauser | |
| 5,636,862 A * | 6/1997 | Cheung et al. | 280/730.2 |
| 5,647,609 A * | 7/1997 | Spencer et al. | 280/730.2 |
| 5,678,852 A | 10/1997 | Brown et al. | |
| 5,730,464 A * | 3/1998 | Hill | 280/743.2 |
| 5,791,685 A | 8/1998 | Lachat et al. | |
| 6,224,091 B1 | 5/2001 | Eyrainer et al. | |
| 6,237,936 B1 | 5/2001 | Quade et al. | |
| 2006/0119083 A1* | 6/2006 | Peng et al. | 280/730.2 |

FOREIGN PATENT DOCUMENTS

| | | |
|---|---|---|
| DE | 196 35 495 A1 * | 3/1998 |
| DE | 100 32 106 A1 * | 1/2002 |
| GB | 2 322 338 A * | 8/1998 |
| JP | 10-6910 A * | 1/1998 |

* cited by examiner

*Primary Examiner*—Ruth Ilan
(74) *Attorney, Agent, or Firm*—Frank MacKenzie; Artz & Artz, P.C.

(57) ABSTRACT

A seating system for an automotive vehicle includes a side airbag mounted to an outboard portion of a seatback, with the side airbag having an occupant reaction surface which is combined with deployable upper and lower reaction members attached to the airbag to define an augmented occupant reaction surface available upon inflation of the airbag.

13 Claims, 2 Drawing Sheets

VEHICLE SEATING SYSTEM WITH AIRBAG-BASED OCCUPANT REACTION SURFACE

BACKGROUND OF THE INVENTION

1. Field of the Invention

The present invention relates to a vehicular seating system in which a side airbag serves not only as a direct occupant reaction device, but also as a positioning device for additional occupant reaction surface members in which, when combined with the airbag provide increased occupant reaction capability.

2. Disclosure Information

Deployable side airbags typically have a central portion attached to the airbag module, which is itself mounted to a seatback of the vehicle, and upper and lower portions. With a conventional side airbag, the ability to react to the occupant is limited because the airbag may tend move out of position during an occupant reaction event. U.S. Pat. No. 5,730,464 discloses a door mounted airbag module with a tether covering the upper and lower portions of the airbag. When engaged by the occupant, the tether pulls the airbag toward the vehicle's occupant. Unfortunately, the system of the '464 patent is not suitable for use with an airbag system packaged within the seatback of a vehicle. This means that the system of the '464 patent does not track the position of the occupant seat, which tends to limit the efficiency of the airbag system.

SUMMARY OF THE INVENTION

A seating system for an automotive vehicle includes a seat cushion attached to a frame mounted upon a vehicle floorpan, a seatback mounted to the seat cushion frame, and an airbag-based occupant reaction surface including a side airbag mounted to an outboard portion of the seatback, with the side airbag having an occupant reaction surface with a vertical midpoint, an uppermost portion, and a lowermost portion. An upper reaction member includes a fabric panel having a first linear edge attached to an upper portion of the seatback and a second linear edge attached to the reaction surface of the airbag at a location which is mediate the vertical midpoint and the uppermost portion of the airbag. A lower reaction member includes a generally planar fabric panel having a first linear edge attached to a lower portion of a seatback and a second linear edge attached to the reaction surface of the airbag at a location which is mediate the vertical midpoint of the occupant reaction surface and the lowermost portion of the airbag.

Each of the upper and lower reaction members includes a separate fabric panel attached to both the seatback and to the airbag's cover. A seatback according to the present invention may include either a modular headrest, or an integral headrest, with the upper reaction member extending to an upper portion of the integral headrest. The airbag is preferably mounted within a module fixed to an outboard side of the seatback and may be inflated by either a pyrotechnic or other type of inflation device upon detection of a side impact event. The module within which the airbag is mounted preferably includes upper and lower walls, with the upper wall having an aperture permitting passage of the upper reaction member and with the lower wall having an aperture permitting passage of the lower reaction member. The upper and lower reaction members are oriented such that their first linear edges are generally vertically oriented, whereas the second linear edges are generally horizontally oriented. The horizontal edges of the upper and lower reaction members are generally located proximate the upper and lower walls of the airbag module.

In essence, the airbag functions as an inflatable positioning unit having a stowed position within a seatback and a deployed position extending generally forward. Similarly, the upper and lower reaction members have stowed positions within the seatback and deployed positions extending from the seatback and generally forward along horizontal second binding edges with the central reaction surface of the airbag. Taken together, the central reaction surface of the airbag and the upper and lower reaction members define an occupant reaction surface which is substantially planar. When the occupant reaction system is in its deployed position, the upper and lower reaction members are subjected to tensioning force when the airbag is in its deployed position.

The present vehicle seating system offers the advantage of increasing the size of the side airbag's occupant reaction surface without increasing the package size of the airbag mounting module.

The present vehicle seating system offers the additional advantage of automatically tracking the fore-and-aft location of the seat, which permits more precise positioning of the present composite occupant reaction surface.

Other advantages, as well as objects and features of the present invention, will become apparent to the reader of this specification.

DETAILED DESCRIPTION OF THE PREFERRED EMBODIMENTS

Figure 1:
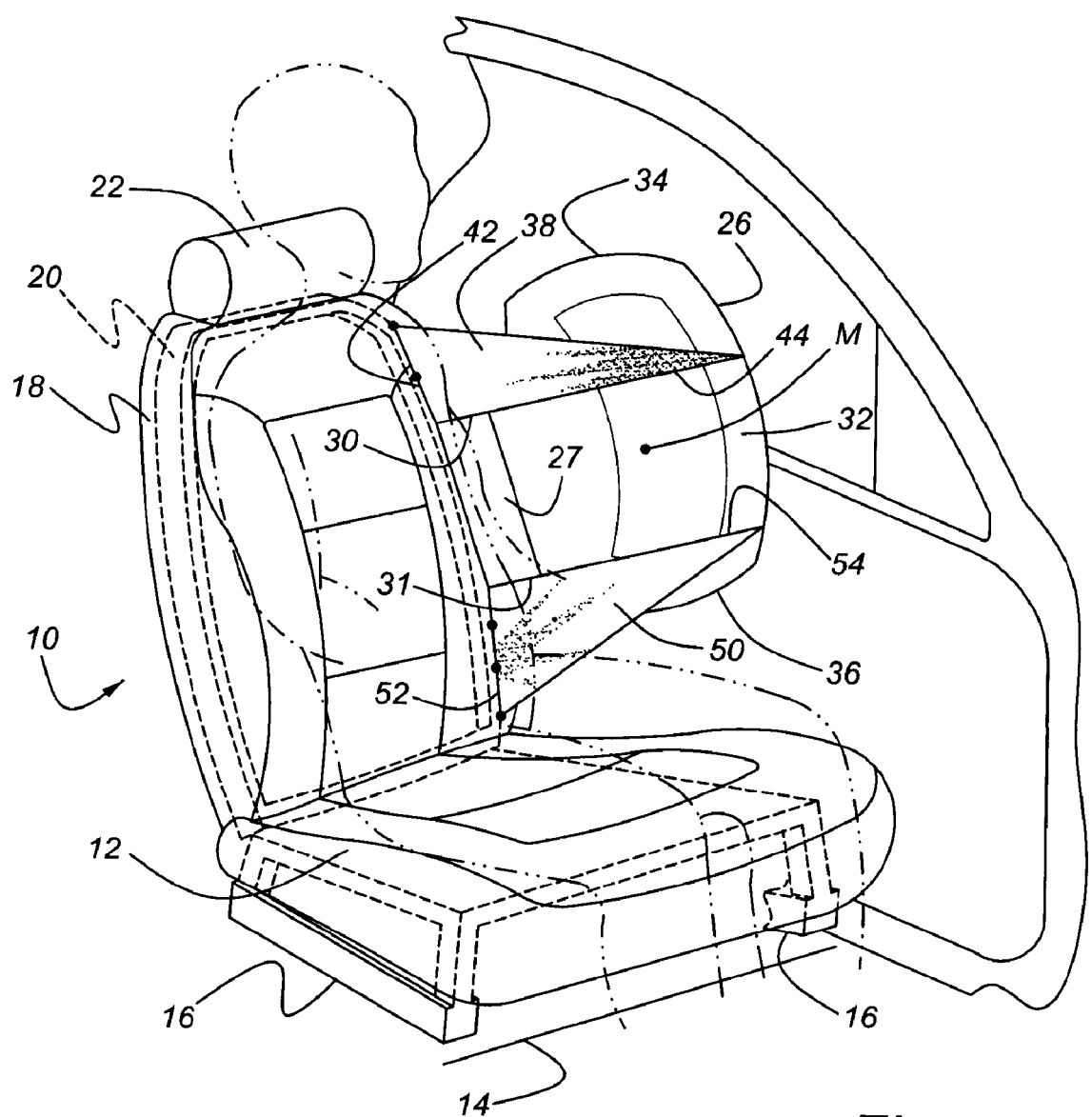
FIG. 1 is a frontal elevation of a vehicle seating system according to the present invention showing the airbag based occupant reaction system in its deployed position.

As shown in FIG. 1, seating system 10 has seat cushion 12 attached to a frame 16, which is mounted upon floorpan 14 of the vehicle. Seatback 18 is mounted to seat cushion frame 16 and has its own frame 20. Headrest 22 is mounted on top of seatback 18. Side airbag 26 is secured within an outboard portion of seatback 18. Side airbag 26 has an occupant reaction surface, 32, with a vertical midpoint, M. Side airbag 26 also has an uppermost portion 34, and a lowermost portion, 36.

Figure 2:
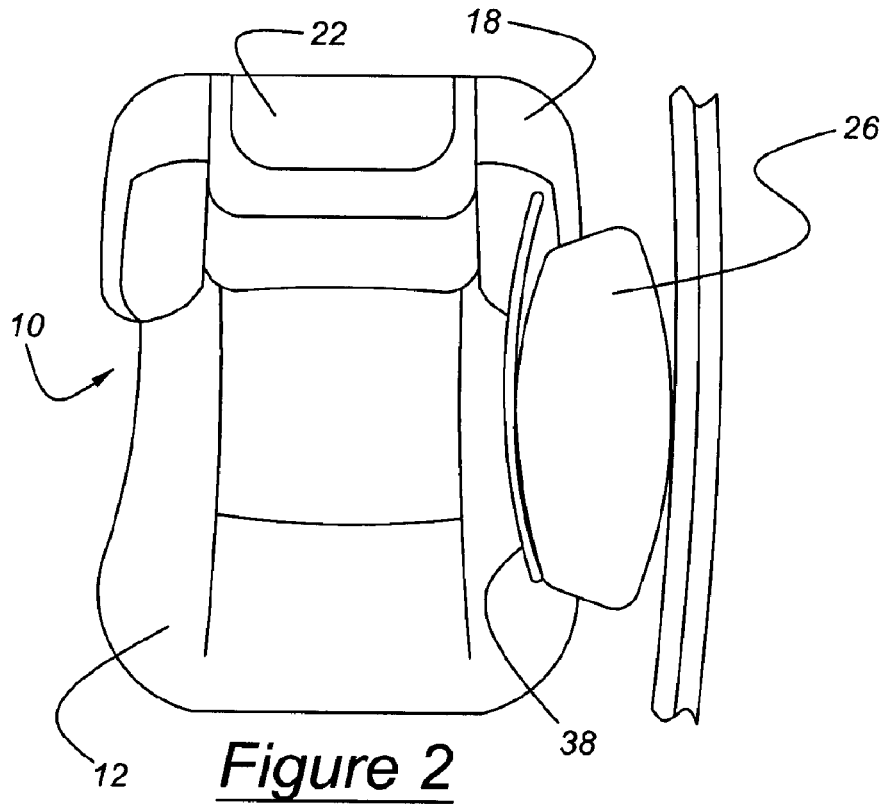
FIG. 2 is a plan view of the system shown in FIG. 1.

Airbag 26, which is shown in a deployed position in FIGS. 1 and 2, is part of a composite reaction surface including upper reaction member 38, which includes a fabric panel having the first linear edge 42 which is generally vertically oriented, and a second linear edge, 44, which is oriented generally horizontally. Upper reaction member 38 is attached to reaction surface 32 of airbag 26, along second linear edge 44, at a location which is mediate vertical midpoint M, and uppermost portion 34 of occupant reaction surface 32. Upper reaction member 38 may be attached by stitching, bonding, mechanical fastening, weaving, or by a combination of these or other methods and techniques. Similarly, lower reaction member 50 includes a fabric panel having first linear edge 52 which is generally vertical and a second linear edge, 54, which is generally horizontal, and which is joined, either by stitching, bonding, mechanical fastening, weaving, or by other means to reaction surface 32 of airbag 26 at a position which is generally mediate midpoint M and lowermost portion 36 of occupant reaction surface 32. Upper reaction member 38 and lower reaction member 50 are preferably constructed of fabric material having performance characteristics similar to those of airbag fabric. In a preferred embodiment, upper reaction member 38 and lower reaction member 50 have generally planar configurations.

Side airbag 26 is mounted within a module, 27, which is itself mounted within seatback 18. Module 27 has an upper aperture, 30, formed in an upper wall, and a lower aperture, 31, formed in a lower wall. Apertures 30 and 31 allow upper reaction member 38 and lower reaction member 50 to remain outside module 27 when airbag 26 is in its stowed position.

When the present occupant reaction system is fully deployed as shown in FIG. 2, upper reaction member 38, lower reaction member 50, and central reaction surface 32 of airbag 26 combine to define a substantially planar occupant reaction surface which extends generally forward from seatback 18 in a direction generally parallel to both the outboard edge of seat cushion 12 and door 24. Upper reaction member 38 and lower reaction member 50 are subjected to tensioning force when airbag 26 is in its deployed position as in FIGS. 1 and 2, and this assists in the definition or formation of the present occupant reaction surface including the upper and lower reaction members and occupant reaction surface 32 of airbag 26.

Figure 3:
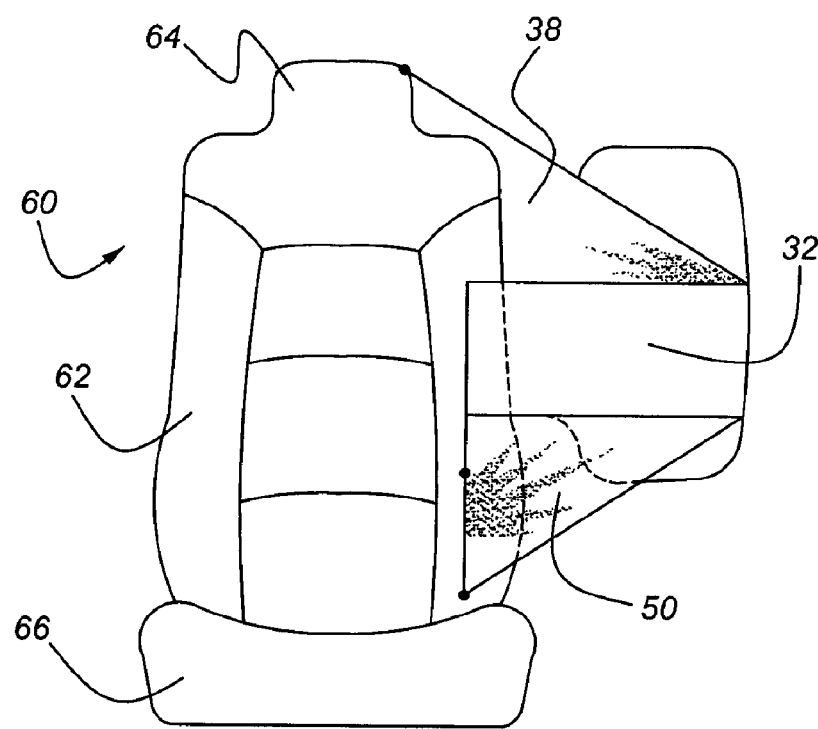
FIG. 3 is a view similar to FIG. 1, but shows a seatback having an integrated headrest incorporated therein.

FIG. 3 illustrates an embodiment of the present invention in which integral head rest 64 is applied to seatback 62. In this case, upper reaction member 38 is attached to head rest 64, thereby allowing upper reaction member 38 to extend to a greater vertical height than is possible with embodiment shown in FIGS. 1 and 2. Similarly, lower reaction member 50 extends to and is mounted partially upon seat cushion 66, which further serves to increase the size of the occupant reaction surface defined by upper reaction member 38, lower reaction member 50, and airbag occupant reaction surface 32.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A seating system for an automotive vehicle, comprising:
   a seat cushion attached to a frame mounted upon a vehicle floorpan; a seatback mounted to said seat cushion frame; and
   an airbag-based composite occupant reaction surface, comprising:
     a side airbag mounted to an outboard portion of said seatback, with said side airbag having an occupant reaction surface with a vertical midpoint, an uppermost portion and a lowermost portion;
     an upper reaction member comprising a fabric panel having a first linear edge attached to an upper portion of said seatback and a second linear edge attached to said reaction surface of said airbag at a location which is mediate said vertical midpoint and the uppermost portion of said airbag; and
     a lower reaction member comprising a fabric panel having a first linear edge attached to a lower portion of said seatback and a second linear edge attached to said reaction surface of said airbag at a location which is mediate said vertical midpoint and said lowermost portion of said airbag.

2. A seating system according to claim 1, wherein seatback further comprises an integral headrest, with said upper reaction member extending to an upper portion of said headrest.

3. A seating system according to claim 1, wherein said airbag is mounted within a module fixed to an outboard side of said seatback.

4. A seating system according to claim 3, wherein said module comprises upper and lower walls, with the upper wall having an aperture permitting passage of said upper reaction member, and with the lower wall having an aperture permitting passage of said lower reaction member.

5. A seating system according to claim 4, wherein said first linear edge of said upper reaction member is oriented generally vertically, and said second linear edge of said upper reaction member is oriented generally horizontally.

6. A seating system according to claim 5, wherein said second linear edge of said upper reaction member is located proximate said upper wall of said module.

7. A seating system according to claim 4, wherein said first linear edge of said lower reaction member is oriented generally vertically, and said second linear edge of said lower reaction member is oriented generally horizontally.

8. A seating system according to claim 7, wherein said second linear edge of said upper reaction member is located proximate said lower wall of said module.

9. A seating system according to claim 1, wherein said upper reaction member and said lower reaction member each comprise a separate, generally planar, fabric panel.

10. An airbag-based composite reaction system for an occupant of an automotive vehicle, comprising:
    an inflatable positioning airbag having a central reaction surface attached to a module mounted to a seatback, with said airbag having a stowed position within said seatback and a deployed position extending generally forward of said seatback;
    an upper reaction member having a stowed position alongside said seatback and a deployed position extending from said seatback and generally forward along a horizontal binding with said central reaction surface of said airbag, with said binding being located at a position above the midpoint of the central reaction surface, such that said upper reaction member overlies a portion of said airbag located above said midpoint; and
    a lower reaction member having a stowed position alongside said seatback and a deployed position extending from said seatback and generally forward along a horizontal lower binding with said central reaction surface of said airbag, with said lower binding being located at a position below the midpoint of the central reaction surface, such that lower reaction member overlies a portion of said airbag located below said midpoint.

11. An airbag-based occupant reaction system according to claim 10, wherein said central reaction surface of said airbag and said upper reaction member and said lower reaction member define a substantially planar occupant reaction surface when said occupant reaction system is in its deployed position.

12. An airbag-based occupant reaction system according to claim 10, wherein said upper reaction member and said lower reaction member are subjected to tensioning force when said airbag is in its deployed position.

13. An airbag-based occupant reaction system according to claim 10, wherein said lower reaction member has a first end attached to not only said seatback, but also to said seat cushion, and a second end attached to said central reaction surface of said airbag.

* * * * *